United States Patent
Baldwin et al.

(10) Patent No.: US 6,204,430 B1
(45) Date of Patent: *Mar. 20, 2001

(54) HEXAMETAPHOSPHATE AS AN AGENT FOR TREATING WASTES, PREPARING CONSTRUCTION MATERIALS AND STABILIZING SOILS

(75) Inventors: Charles E. Baldwin, Golden; Alioune Sogue, Denver, both of CO (US)

(73) Assignee: Rocky Mountain Remediation Services LLC, Golden (*) Notice: Subject to any disclaimer, the term of this patent is extended or adjusted under 35 U.S.C. 154(b) by 0 days.

This patent is subject to a terminal disclaimer.

(21) Appl. No.: 09/025,657

(22) Filed: Feb. 18, 1998

(51) Int. Cl.$^7$ .............................. A62D 3/00; G21E 9/00; E02D 3/12

(52) U.S. Cl. ............................. 588/236; 588/2; 588/18; 588/252; 588/256; 405/263

(58) Field of Search .......................... 428/2; 405/128, 405/263, 271; 588/2, 16, 256, 252, 18, 236; 252/625; 423/10

(56) References Cited

U.S. PATENT DOCUMENTS

| Re. 32,329 | * | 1/1987 | Paszner ............................ 264/108 |
| 3,201,268 | | 8/1965 | Hemwall . |
| 3,640,021 | | 2/1972 | Grafmuller . |
| 3,645,764 | | 2/1972 | Stram . |
| 3,959,975 | | 6/1976 | Graf . |
| 3,965,237 | | 6/1976 | Paige . |
| 4,050,865 | | 9/1977 | Drostholm et al. . |
| 4,231,984 | | 11/1980 | Hofmann . |
| 4,289,540 | | 9/1981 | Yong et al. . |
| 4,330,409 | | 5/1982 | Yong et al. . |
| 4,334,029 | | 6/1982 | Naito et al. . |
| 4,353,749 | | 10/1982 | Ray et al. . |
| 4,361,661 | | 11/1982 | Jackson . |
| 4,456,574 | | 6/1984 | Frey et al. . |
| 4,470,839 | | 9/1984 | Gago . |
| 4,531,903 | | 7/1985 | Frey et al. . |
| 4,559,004 | | 12/1985 | Augier . |
| 4,889,640 | | 12/1989 | Stanforth . |
| 4,919,711 | | 4/1990 | Banyai et al. . |
| 4,950,409 | | 8/1990 | Stanforth . |
| 5,037,479 | | 8/1991 | Stanforth . |
| 5,114,568 | | 5/1992 | Brinsmead et al. . |
| 5,145,692 | | 9/1992 | Hereford . |
| 5,154,874 | | 10/1992 | Koslowski . |
| 5,162,600 | * | 11/1992 | Cody et al. ............................ 588/236 |
| 5,193,936 | | 3/1993 | Pal et al. . |
| 5,202,033 | | 4/1993 | Stanforth et al. . |
| 5,284,636 | | 2/1994 | Goff et al. . |
| 5,286,427 | | 2/1994 | Koumal . |
| 5,292,467 | | 3/1994 | Mandish et al. . |
| 5,352,444 | | 10/1994 | Cox et al. . |
| 5,366,548 | | 11/1994 | Riddle . |
| 5,374,307 | | 12/1994 | Riddle . |
| 5,397,478 | | 3/1995 | Pal et al. . |
| 5,405,441 | | 4/1995 | Riddle . |
| 5,414,197 | * | 5/1995 | Wakeley et al. ............................ 588/2 |
| 5,425,807 | | 6/1995 | Riddle . |
| 5,436,384 | | 7/1995 | Grant et al. . |
| 5,453,123 | | 9/1995 | Burge et al. . |
| 5,512,702 | | 4/1996 | Ryan et al. . |
| 5,527,982 | | 6/1996 | Pal et al. . |
| 5,534,058 | | 7/1996 | Strabala . |
| 5,536,899 | | 7/1996 | Forrester . |
| 5,545,805 | | 8/1996 | Chesner . |
| 5,569,155 | | 10/1996 | Pal et al. . |
| 5,587,157 | | 12/1996 | Cox et al. . |
| 5,589,164 | | 12/1996 | Cox et al. . |
| 5,591,116 | | 1/1997 | Pierce . |
| 5,637,355 | | 6/1997 | Stanforth et al. . |
| 5,645,518 | | 7/1997 | Wagh et al. . |
| 5,674,176 | | 10/1997 | Pierce . |
| 5,678,233 | * | 10/1997 | Brown ............................ 588/2 |
| 5,732,367 | * | 3/1998 | Yost et al. ............................ 588/16 |
| 5,771,472 | * | 6/1998 | Carpena et al. ............................ 588/2 |
| 5,830,815 | * | 11/1998 | Wagh et al. ............................ 501/155 |
| 5,846,894 | * | 12/1998 | Singh et al. ............................ 501/155 |

FOREIGN PATENT DOCUMENTS

| 8299935 | * | 11/1996 | (JP) ............................ 588/236 |
| 9731874 | * | 9/1997 | (WO) ............................ 588/236 |

OTHER PUBLICATIONS

Mittelhauser Corporation/Terrafix Inc., "What's New at Mittelhauser," Internet page.
Mittelhauser Corporation/Terrafix Inc., "Treatment Unit Description," Internet page.
American Minerals, Inc., Enviro–Blend brochure.
D.D. Double, "Chemically Bonded Ceramics," J. Mater. Educ., vol. 12, pp. 353–381, 1990.
C. Merigou, et al., "Leaching of $^{223}$Ra from a matrix of the low temperature form of thorium monophosphate," New J. Chem., vol. 19, pp. 1037–1045, 1995.

* cited by examiner

Primary Examiner—Gary P. Straub
(74) Attorney, Agent, or Firm—Gibson, Dunn & Crutcher LLP (57) ABSTRACT

The current invention provides methods for stabilizing wastes, preparing construction materials and stabilizing soils using compositions including hexametaphosphate, with or without other additives. More particularly, one method of the invention discloses a process for treating a variety of materials including solid and liquid-containing wastes, including for example, common debris or hazardous, radioactive or toxic waste. This method involves combining a waste material with hexametaphosphate, and in some cases other additives. The resulting amended waste may also be compacted. Another method involves use of hexametaphosphate compositions to prepare construction materials. This method involves combining hexametaphosphate with a starting material such as soil, soil-containing compositions, mine tailings, mill tailings and combinations thereof. The resulting mixture is then compacted. The method yields a solid material in which the hexametaphosphate chemically and physically binds to soil constituents, thus yielding a hard product which exhibits high compressive strength and excellent durability. An additional method provides compositions including hexametaphosphate which can be applied to stabilize soil surfaces, thereby providing a method for protecting soil surfaces against erosion and other forces. The present invention also provides construction materials and soil stabilized compositions containing hexametaphosphate.

62 Claims, 4 Drawing Sheets

HEXAMETAPHOSPHATE AS AN AGENT FOR TREATING WASTES, PREPARING CONSTRUCTION MATERIALS AND STABILIZING SOILS

FIELD OF THE INVENTION

The present invention broadly relates to the field of waste and soil stabilization. With regard to waste stabilization, the present invention relates to the field of treating wastes, including environmental media and other materials. More particularly, the present invention relates to a method of treating solid and liquid-containing wastes, whether such wastes are ordinary debris or are hazardous, toxic or radioactive wastes or combinations thereof, including, for example, wastes containing contaminants, pollutants, asbestos, pesticides, herbicides, polychlorinated biphenyls and metals. Such constituents may be defined in federal and state environmental, health and safety statutes such as RCRA, CERCLA, TSCA, AEA or subsequent statutes. With regard to soil stabilization, the invention relates to the use of binders to stabilize soils against erosion and other forces.

More specifically, the invention relates to the use of a compound, hexametaphosphate, which has utility in stabilizing wastes to prevent the leaching of contaminants from the waste, as a binder in earthen construction forms and as a stabilizer of soils to protect against soil erosion. The invention also relates to construction materials, to soil stabilizing compositions and to earth stabilized compositions containing hexametaphosphate.

BACKGROUND OF THE INVENTION

A significant amount of research has been directed at identifying methods and compositions which, broadly speaking, can be used to stabilize wastes and soils. For instance, numerous methods and compositions have been developed which are capable of stabilizing wastes, particularly contaminated soils, so that the rate at which contaminants leach from the treated waste is minimized. Other methods utilize agents which effectively bind constituents within soil, thus enabling a solid construction material to be prepared from a mixture of the soil and agent. Finally, other methods utilize compositions which have utility in stabilizing soil surfaces, thereby providing a base for construction materials and/or protecting against erosion. Ideally, however, various methods using a similar agent would be capable of achieving any of the foregoing types of stabilization. The present invention provides such methods. In particular, the current invention discloses methods which utilize hexametaphosphate (HMP), with or without other additives such as fly ash, to stabilize waste materials, to prepare construction materials and to stabilize soils against erosion.

Considering waste stabilization first, particularly the stabilization of contaminated soils, methods capable of stabilizing wastes have great utility given society's current concern about properly disposing of waste in order to safeguard human health, wildlife and the environment. This concern is manifested in the numerous state and federal regulations which govern the handling of wastes.

Several general strategies have been developed to meet current regulations or at least partially stabilize wastes. One general approach involves solidification. This approach utilizes binders to produce an end product having low permeability characteristics, thereby significantly reducing the rate at which contaminants leach from the waste. The solidification approach often involves the use of grout, cement, lime and/or silicates as the solidifying agent. Methods using fly ash to encapsulate waste materials fall into this category. Because fly ash, the coal combustion by-product generated in large coal-fired utility plants, has a high silica content, it is possible to initiate a pozzoulanic reaction by pressurizing a mixture of fly ash and water. Waste materials included within a mixture having a high fly ash content can thus be encapsulated (U.S. Pat. Nos. 5,425,807, 5,405,441, 5,374,307 and 5,366,548 to Riddle). Related uses of fly ash are described in U.S. Pat. Nos. 5,154,771 to Wada, et al.; 4,659,385 to Costopoulos, et al.; 3,625,723 to Sicka; 5,534,058 to Strabala; 4,615,809 to King; and 5,627,133 to Nelson.

Chemical stabilization or fixation comprises another general waste treatment method. These methods involve addition of one or more chemical additives to the waste so that contaminants are converted into an insoluble form. The use of phosphate compounds fits within this general approach. Many stabilization methods using phosphate compounds are used in conjunction with a buffering agent or a secondary complexing agent to stabilize heavy metal-containing wastes. Several U.S. Patents are directed at using phosphate compounds solely to treat lead-contaminated materials. Illustrative of this group are U.S. Pat. Nos. 5,193,936 and 5,569,155 to Pal; 5,536,899 to Forrester; 5,545,805 to Chesner; 5,512,702 to Ryan; and 5,5162,600 to Cody.

Other U.S. patents describe the use of phosphates, again generally with a buffering component, to treat wastes containing heavy metals besides just lead. Patents describing this approach include: U.S. Pat. Nos. 5,527,982 and 5,397,478 to Pal; 5,037,479, 5,202,033 and 5,637,355 to Stanforth; 5,591,116 and 5,674,176 to Pierce; and 5,645,518 to Wagh. In some cases these approaches specifically require the formation of a slurry (U.S. Pat. No. 5,645,518 to Wagh) or note that dry mixing of treatment agents may not provide the correct conditions to enable the necessary stabilizing chemical reactions to occur (see for example, U.S. Pat. Nos. 5,037,479 and 5,202,033 to Stanforth). Related methods utilizing phosphate compounds are described in U.S. Pat. Nos. 3,959,975 to Graf; 4,334,029 to Naito, et al., 3,640,021 to Grafmuller; 3,201,268 to Hemwall; 4,919,711 to Banyai, et al.; and 4,231,984 to Hofman.

Turning now to agents which can be used in construction materials, methods of preparing bricks from fly ash have been described (U.S. Pat. Nos. 5,425,807, 5,405,441, 5,374,307 and 5,366,548 to Riddle; 5,154,771 to Wada, et al.; 4,659,385 to Costopoulos, et al.; 3,625,723 to Sicka; 5,534,058 to Strabala; 4,615,809 to King; and 5,627,133 to Nelson). As noted above, this is accomplished by pressurizing mixtures of fly ash and water, preferably in combination with bottom ash, in order to accelerate a pozzoulanic reaction which yields a solid product. Of the soil-based construction materials, adobe bricks are perhaps the most well-known. These bricks are prepared by thoroughly mixing soil and water to produce a plastic form that can be molded into almost any shape.

With regard to compositions which can be used to stabilize soil surfaces, numerous compositions have been developed. These compositions may stabilize the soil surface by actually binding soil particles or by forming a protective film on the soil surface. Ideally, these compositions protect against natural forces and/or against physical impact from foot or vehicular traffic, as well as providing a means for minimizing dust formation.

Many of the compositions which have been developed are complex formulations, often including various organic polymers. A few patents have issued in which the stabilizing agent includes a phosphate agent. For example, U.S. Pat. No. 3,201,268 to Hemwall, describes a method for stabilizing soils by mixing soils having a high clay content with phosphoric acid and water-soluble lead. One disadvantage of this approach is that it involves the addition of lead, a toxic compound, to the soil; the method also requires the use of a very strong acid. Another patent (U.S. Pat. No. 3,640,021 to Grafmuller) describes a mixture including a vinyl polymer and hexametaphosphate.

This brief overview illustrates that although a variety of methods using different agents have been developed to either stabilize wastes, prepare construction materials or stabilize soil surfaces, there remains a need for methods which can use the same agent to accomplish all these tasks. As noted above, the present invention addresses this need by providing methods utilizing hexametaphosphate, a readily available and non-hazardous compound, which provides the desired broad range of soil stabilization. The invention further provides construction materials, soil stabilizing compositions and earthen compositions containing hexametaphosphate.

SUMMARY OF THE INVENTION

The current invention provides in part a method for treating or stabilizing a variety of wastes. In form the wastes may be solids, liquids or combinations thereof. Thus it is possible to treat, for example, soils, sludges, slurries and mill and mine tailings. With regard to composition, the wastes may include ordinary debris, including but not limited to, aggregate, glass, metal, plastic, paper, concrete, asphalt, wood, ceramics and combinations thereof. The waste may also be a hazardous or toxic waste containing heavy metals, contaminants, or pollutants, or be a radioactive or mixed waste. Thus, the method can be used to stabilize hazardous wastes containing, for example, contaminants, pollutants, asbestos, pesticides, herbicides, polychlorinated biphenyls, metals and combinations thereof.

More specifically, the invention provides a method for treating such wastes by combining the waste with hexametaphosphate (HMP) to form an amended waste in which contaminants, heavy metals and the like are stabilized so that they do not leach from the amended waste at levels above current regulatory limits. The amended waste may be compacted to form a solid material which encapsulates and stabilizes the waste. If desired, other additives such as fly ash, a metal oxide agent, an oxidizing agent, a reducing agent or combinations of these can be added. It is even possible to add debris to the mixture so that it too is encapsulated in the final product. This method has the advantage of utilizing an inexpensive and readily available material and can be carried out at room temperature. When the method includes compaction, a solid monolith is formed which stabilizes contaminants by both chemical and physical means such that the final product reduces the leaching of contaminants to below current regulatory limits. The compacted product also exhibits high compressive strength and can be formed into any number of predetermined shapes.

The current invention further provides construction forms or materials and a method for producing such construction forms. In its simplest form, the construction materials provided for in the present invention comprise a compacted mixture including a starting material and HMP. The starting material may include soils, soil-containing compositions, mine tailings, mill tailings and combinations thereof However, the construction form may also include additives such as debris, fly ash, and a metal oxide agent.

The construction materials or forms described in this invention have several advantages. The construction forms can be produced from diverse starting materials. As noted above, HMP, the binder provided for in this invention, is inexpensive and readily available. The construction forms can also be produced using standard soil handling equipment, thereby allowing the forms to be easily manufactured in a variety of settings, including field operations. The construction forms exhibit high compressive strength, as well as good durability and workability. The strength of the construction forms is because the HMP in the construction form binds with constituents in the starting material, thus forming a cohesive matrix which binds particles within the construction form together. The result is a hard, ceramic-like material in which constituents in the starting material are held together by chemical and physical means.

The present invention also provides a method for producing construction forms. In general, the method involves mixing a starting material as defined above with HMP. If desired, an additive can be included with the starting material and the HMP. The resulting mixture is then compacted to yield a construction form. A water-proofing agent may also be added to the form to provide additional durability in wet environments. Finally, the construction material or form may be cured at room temperature to further increase the compressive strength of the form. The method of preparing construction forms as disclosed in the present invention has numerous advantages. First, the method utilizes HMP, a non-hazardous binder. Moreover, while HMP is generally supplied as a solution, HMP can be used directly as a powder, particularly when the starting material contains some moisture.

Although additives can be included when preparing the construction forms, they are not required. The result is a simple and inexpensive way of preparing construction materials. The method produces a hard, ceramic-like material which binds constituents and any contaminants in the starting material by both chemical and physical means, thus yielding a product which has long term stability. Additionally, construction materials can be prepared from contaminated starting materials or contain contaminated waste. The contaminants in the construction material are effectively encapsulated so that leach rates are very low.

The present invention also provides a method for stabilizing soils. The method includes the steps of preparing a stabilizing solution by combining a quantity of hexametaphosphate with water, applying the solution to soil at a treatment site to form a treated soil and then compacting the treated soil. Solid hexametaphosphate may be applied directly to the soil rather than applying a hexametaphosphate solution. The HMP (solid or solution) may be applied at the treatment site (in-situ treatment) or at a separate mixing site.

The current invention additionally provides a stabilized earthen composition comprising a mixture of hexametaphosphate and soil, as well as a soil stabilizing composition including HMP and water.

The simplicity of the present soil stabilizing method and composition is an important advantage. The method requires only a single component, whereas many stabilizing methods require the use of complex compositions including multiple components. The composition is also easily prepared from inexpensive starting materials and can be easily applied to the treatment site.

DETAILED DESCRIPTION OF PREFERRED EMBODIMENTS

Waste Treatment

In part, this invention addresses the need to develop new methods for the treatment or stabilization of various waste forms such that the end product meets regulatory and disposal requirements for a number of waste streams. The terms "treating" or "stabilizing" wastes are meant to refer to processes in which the waste is physically and/or chemically modified so that pollutants and/or contaminants located in the waste or material do not leach from the treated or stabilized material; the terms may also include processes which result in treated materials that can withstand physical and/or chemical degradation or forces.

As used herein, "waste" is meant to generally refer to materials which are no longer deemed to be of value or to have use in their current form, including environmental media and other materials. Waste may more specifically include debris, or more dangerous wastes such as hazardous waste, radioactive waste and mixed waste. Such waste can include metal-contaminated waste, for example waste which is contaminated with heavy metals such as arsenic, cadmium, chromium, lead, mercury, selenium, silver and nickel. Wastes may also contain contaminants, pollutants, asbestos, pesticides, herbicides, polychlorinated biphenyls, metals and combinations thereof. Such constituents may be defined in federal and state environmental and safety statutes, such as RCRA, CERCLA, TSCA or AEA. Solid waste does not mean solid waste as defined under RCRA, but refers to waste which is neither a liquid or gas.

"Radioactive waste" as used herein refers to wastes that are Naturally Occurring or Accelerator Produced Radioactive Material (NORM/NARM) or which contain contaminants as defined in the Atomic Energy Act (AEA). "Mixed wastes" are meant to refer to wastes which contain hazardous and radioactive contaminants. It is possible using the method of the present invention to encapsulate hazardous, radioactive and mixed wastes into a compacted and solid monolith which facilitates disposal.

This invention is also applicable to treating secondary waste streams from other processes such as soil washing and thermal treatment processes. Additionally, the method described herein can also be used to encapsulate debris including, but not limited to, paper, plastic, concrete, asphalt, wood, metal, glass, aggregate, ceramics and combinations thereof. This capability allows the disposal of secondary wastes from processing and construction which would otherwise require other treatment and disposal options.

While many other waste treatment systems rely on the use of dangerous phosphoric acid additions, this invention utilizes HMP, a non-hazardous compound. When HMP is combined with water, the resulting HMP solution can safely and easily be added to the waste, thus making the process much more amenable to field operations. In some cases, it is possible to use HMP directly as a dry powder, particularly when the waste contains moisture.

Additionally, the method can be performed at room temperature and accomplished economically with commonly used soil handling equipment at minimal capital cost. Further, this method is capable of using only HMP in conjunction with compaction to stabilize wastes; unlike many other methods, it is not necessary to add other additives. In particular, it is not necessary to add sulfate agents (including, for example, gypsum, anhydrite, alum and halites), carbonate agents (including, for example, simple carbonate salts as well as lime and Portland cement), complexing agents (including, for example, Fe(II), Fe(III) or Al(III)), metal oxides (including, for example, MgO, CaO, FeO, $Fe_2O_3$ and $Fe_3O_4$), or hydroxides in order to sufficiently stabilize wastes so that the end product is capable of passing leach tests. The result is a simpler and less expensive method of treating wastes.

Of particular importance, the HMP used in the present method effectively reacts with the contaminants in a waste, even wastes having very high concentrations of contaminants, to form stable compounds in which the leach rates are below regulatory limits. In part, this stabilization is a consequence of HMP reacting with contaminating metals to form highly insoluble metal phosphate complexes. In these complexes, the metal ion is inactivated and no longer participates in its usual chemical reactions. In addition, HMP reacts with other constituents in the waste to form a matrix which further impedes leaching of contaminants. Decreased permeability is furthered through the compaction step. The result when the compaction step is included is a hard ceramic-like material which binds contaminants and constituents in the waste by both chemical and physical means and thus has long-term stability for disposal. The volume reduction also permits increased waste loading at disposal sites and the potential for using the compacted amended waste as a construction material, including, but not limited to, disposal pit liners.

While some of the other phosphate stabilization methods which have been described require the formation of slurries, the present invention can be accomplished using waste forms with minimal moisture content. It is also not necessary to grind the starting material to a powder.

Treatment of Solid Wastes

Figure 1:
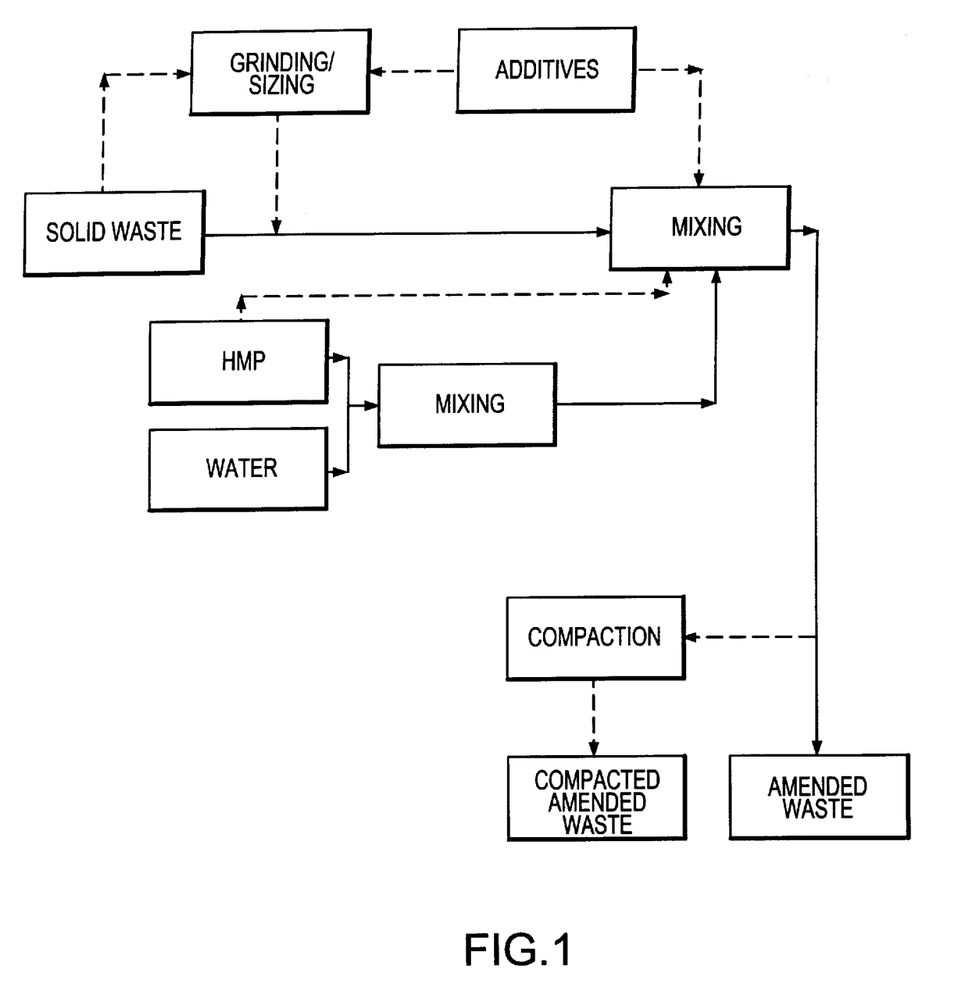
FIG. 1 is a schematic diagram of a method for treating solid waste according to the current invention.

The method of the invention is shown schematically in FIG. 1. The broken lines indicate optional steps. Initially, solid waste feed material is preferably size reduced to less than 4 centimeters in all dimensions. Typically, such size reduction is achieved by grinding and then screening the ground waste. Grinding or pulverizing of the solid waste can be accomplished using equipment such as hammermills, ballmills, jawcrushers and shredders appropriate to the waste form. Screening is done using stationary or vibratory screen systems. The grinding step, however, does not require formation of a powder in which the average particle size is at the micron level.

Separately, a solution containing HMP is prepared from a concentrated form of HMP diluted with water. Although the use of a solution is preferable, it is possible to apply the HMP as a dry powder, especially if the waste feed has sufficient inherent moisture. Any of the HMP salts may be utilized in this invention; sodium hexametaphosphate has been found to give particularly good results and is available from Monsanto.

In determining the effective amount of HMP to employ in order to achieve a compacted amended waste which significantly reduces metal leaching, it is useful to conduct an initial screening test with a small but representative sample of the waste to be treated. The amount of HMP required will depend upon the amount of contaminant in the waste and on the characteristics of the waste. In general, however, the amount of HMP added, based upon the dry weight of the powder, is between approximately 0.5 to 8 percent of the initial waste by weight; concentrations of between approximately 1 to 3 percent by weight is most preferred.

In a combining or mixing step, the solid waste feed material is then preferably mixed with the HMP solution to yield an amended waste. It is possible to add one or more additives to the solid waste in the combining step as well. These additions may be prior to, at the time of, or after the HMP is mixed with the solid waste. Like the solid waste, additives are preferably size reduced to 4 centimeters or less in all dimensions For example, a quantity of debris may also be mixed with the solid waste. As noted above, the debris may include, but is not limited to, paper, plastic, concrete, asphalt, wood, metal, glass, ceramics and combinations thereof Preferably, the amount of debris added is 10 percent or less of the solid waste by volume.

Fly ash may also be added to the solid waste. As used here, "fly ash" is meant to include by-products in the combustion of coal in large power plants. Preferably, the fly ash is Class C or Class F fly ash which can be purchased from a variety of sources. The fly ash is generally added to provide additional strength to the compacted product. The amount of fly ash added preferably does not exceed 25 weight percent based on the initial weight of the waste, and may be less than 15 weight percent in some instances.

It is also possible to include a metal oxide agent with the solid waste. The term "metal oxide agent" is meant to include metal oxides generally, and MgO, CaO, FeO, $Fe_2O_3$ and $Fe_3O_4$ in particular. The amount of metal oxide agent added is typically less than 50 percent by weight relative to the initial solid waste; in some cases, the percentage by weight may be less than 15 percent.

An oxidizing agent or reducing agent may be included in order to achieve the desired oxidation state of a particular metal. Examples of suitable oxidizing agents include the various salts of hypochlorite (for example, $Ca(OCl)_2$ and NaOCl) and hydrogen peroxide.

The combining of the solid waste, HMP and additive(s), if any, can be performed in any type of mixer which can adequately blend the components into a uniform mix, including, for example a pug mill or other standard mixing equipment. If prepared as a solution, HMP can be pumped using conventional pumping into a spray bar which is located in the mixer and the HMP sprayed over the mix. Additions of HMP are typically completed in minutes. The HMP is then mixed with the solid waste and any additives until it is uniformly distributed throughout the mix, thus yielding an amended waste. This combining step can often be accomplished in as little as five minutes or less.

The moisture content of the amended waste is preferably less than 10 percent by weight, and most preferably, is 8 percent or less. Based on the moisture content of the amended waste, additional water may be added as necessary to achieve the preferred moisture levels. The preferred water content will also depend upon the physical characteristics of the solid waste and can be varied so that after compaction a physically stable product is obtained.

After the amended waste has been adequately mixed, it may be compacted using conventional or harmonic compaction techniques. The general term "compaction" as used herein is defined to mean not just the addition of pressure, but the application of force which results in densification and significant volume reduction of the original material.

The term "harmonic compaction" refers to a method for fusing particles by rapidly accelerating and decelerating particles within a mold having at least one moveable side. Accelerations of at least 25 G's to 50 G's, and preferably several hundred to several thousand G's, are required. These rapid accelerations and decelerations are preferably accomplished by rapidly impacting opposing ends of mold between an oscillating member and a pneumatic ram. Typically, the oscillating member is a table which rapidly reciprocates upward and downward and the pneumatic ram is part of an under damped pneumatic system adjusted to oscillate out of phase with the oscillating member.

Under operating conditions, the oscillating member propels the mold from itself toward the pneumatic ram. The pneumatic ram is initially compressed backward but then rebounds, forcing the mold back toward the oscillating member. Deceleration and impact occurs as the pneumatic ram moves the mold toward the oscillating member which is simultaneously moving in the direction of the returning mold. The oscillating impacts are repeated over and over in rapid succession, resulting in the desired compressive forces. The frequency of the reciprocating movements of the oscillating member and the pneumatic ram must be appropriately timed to achieve the necessary impacts. Movement of the mold may be at the harmonic frequency of the oscillating member, hence the name harmonic compaction. U.S. Pat. Nos. 4,531,903 and 4,456,574 to Frey and Wier describe an example of a harmonic compactor and methods for achieving harmonic compaction.

The compaction step can also be accomplished using conventional compaction methods, i.e., non-harmonic compaction methods which do not involve the rapid accelerations and decelerations which characterize harmonic compaction. Conventional compaction techniques and compactors may include vibratory compaction using vibratory tampers, plate compactors and rollers. Compaction may also be accomplished using kneading compaction utilizing, for example, tamping rollers, sheepsfoot rollers, mesh or grid pattern rollers, and rubber tire rollers. Static compaction may also be employed, including, for example, the use of compaction presses and hand-operated tampers. Dynamic compaction is another option, including, for example, the dropping of weights. Any of the compactors, whether they be conventional or harmonic, may be at a fixed site or part of a mobile facility.

Compaction forces will vary depending on the composition of the amended waste and on the intended use of the compacted amended waste, but typically a force up to 3,000 pounds per square inch is applied. Volume reductions up to and greater than 50 volume percent are achieved depending on the composition of the original waste feed and the compaction force which is applied. Typically, compaction achieves a volume reduction of at least 20 percent.

After compacting, the compacted amended waste is allowed to cure at room temperature. Curing times vary and, in general, compressive strength increases with cure; time. However, adequate product strength is typically obtained within about one hour to about one month; generally, the cure period is approximately 7 days..

Because the compaction step yields a product with high compressive strength, the compacted amended waste can be used as a construction material in various construction projects, including for example, waste disposal pit liners. Since contaminants are effectively encapsulated, leaching of contaminants from the construction materials is at very low levels.

Treatment of Liquid-Containing Wastes

The foregoing discussion has focused on describing a method for treating solid wastes. Advantageously, the method can also be used to provide a way for treating liquid-containing wastes. The term "liquid-containing waste" is meant to include a liquid waste or a waste of which a significant portion is a liquid. More specifically, the term is meant to include wastes in which the water composition of the waste by weight is approximately 10 percent or more. Thus, the term is meant to encompass sludges, slurries and liquids.

In treating liquid-containing wastes, the general method described above for solid waste applies (see FIG. 2 where the broken lines indicate an optional step). A primary difference is that in a combining step the liquid portion preferably is initially reduced to approximately 10 percent by weight by adding an additive to absorb part of the liquid. This additive may include any number of materials, but preferably includes soil, a secondary waste, fly ash, a metal oxide agent, an oxidizing agent or combinations of these (terms are as defined above). After combining one or more of these additives with the liquid-containing waste and adding HMP, a compressible amended waste is formed which may be compacted using the procedures and apparatus described above.

Figure 2:
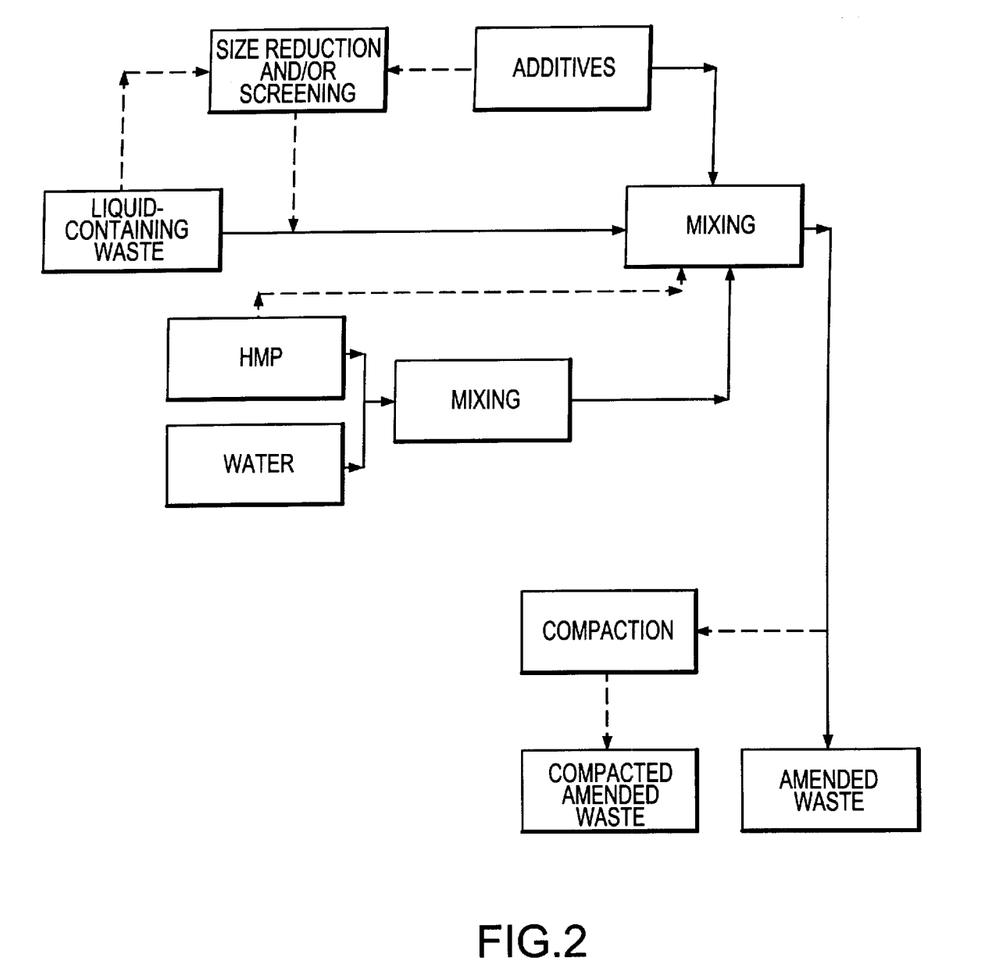
FIG. 2 is a schematic diagram of a method for treating liquid-containing waste according to the present invention.

HMP can be supplied in either solid or liquid form; the concentration at which it is added is as described above for solid waste treatment. If fly ash is added, it typically is added in an amount less than 25 percent by weight relative to the liquid-containing waste, and may be less than 15 percent. A metal oxide, if added, is typically less than 50 percent by weight that of the initial waste; it may be less than 15 percent by weight. If debris is included, the amount added is typically 10 percent or less of the liquid-containing waste by volume.

Compaction may be accomplished using either the conventional compaction methods (e.g., vibratory, kneading, static or dynamic methods) or harmonic compaction method described earlier in the section on treating solid wastes. The compacted amended waste is sufficiently stabilized through chemical and physical means so that contaminants and pollutants are immobilized, thereby satisfying regulatory leaching criteria, especially for metals.

In-situ Treatment of Waste

It is possible to treat and compact waste at its original site rather than compacting the waste at a site separate from the treating site. This method of treating is referred to herein as "in-situ" waste treatment. The initial step in this process is to obtain a representative sample of the waste to assess the amount of phosphate additive necessary. Multiple samples may be required if the site to be treated is large.

The treatment site is divided into sections. The appropriate amount of HMP is then applied. The HMP may be applied in liquid or solid form. In a combining step, HMP is evenly distributed over the treatment site. For large sites where, for example, soil is to be treated, the combining step may be accomplished, for example, by raking in the HMP to an approximately uniform depth or by using standard rotary tillers that are either manually operated or attached to a tractor. If debris, fly ash, metal oxide agents and/or oxidizing agents are also to be added, these materials may be combined with the waste in a like manner.

For sites in which the contaminated zone runs more than a few feet below the surface, it may be necessary to apply the HMP as a solution or slurry. Liquid application alone may be adequate for sufficiently porous soils. In other cases, it may be necessary to apply HMP and any other materials by first perforating the soil or by the use of injection nozzles which can be inserted to sufficient depths.

Once HMP and any other additives have been added and combined with the waste, the site may be compacted. Compaction, if performed, may be accomplished in a number of ways. For example, kneading compaction may be employed by using a variety of rollers. Dynamic compaction methods utilizing pneumatic tampers or methods in which weights are dropped may also be used. Compaction can also be achieved by driving heavy machinery over the treatment site, in which case the tires provide the necessary compressive force.

Construction Forms

Composition of Construction Forms

Another aspect of the present invention is a composition comprising a starting material and HMP, with and without other additives. This composition has numerous applications including, for example, forming construction materials, especially bricks. The composition has additional utility as a mortar to bond the construction forms provided for by this invention as well as other construction materials.

In its most basic form, the composition includes HMP and a starting material which may include soils, soil-containing compositions, mine tailings, mill tailings and combinations of these materials. Any of the various salts of HMP can be used.

The amount of HMP added to the starting material varies but, based upon the dry weight of the powder, 0.5 to 8 percent by weight relative to the starting material is typical; preferably, the amount is approximately 1 to 3 percent by weight.

The composition may also include additives. The particular additive selected for inclusion in the composition may depend upon some characteristic which is desired in the final construction form. Additives may also be included as a convenient way to effectively deal with a waste that would otherwise require separate disposal.

Thus, for example, the composition may also contain a waste. The waste may be debris, including, but not limited to, aggregate, glass, metal, plastic, paper, concrete, asphalt, wood, ceramics and combinations thereof. The waste may also include hazardous waste, radioactive waste or mixed waste as those terms are defined in the section on waste treatment. The amount of waste included in the composition varies somewhat with the nature of the starting material, but generally can comprise up to 10 percent by volume relative to the starting material. Hence, the composition provides a means for encapsulating waste.

The composition may additionally include fly ash, the inclusion of which may help to impart greater strength to the composition. As used here, "fly ash" is meant to include by-products in the combustion of coal in large power plants. Preferably, the fly ash is Class C or Class F fly ash which can be purchased from a variety of sources. The amount of fly ash added preferably does not exceed 25 weight percent relative to the weight of the starting material and may be less than 15 weight percent in some cases.

A metal oxide agent may also be included in the composition. The term "metal oxide agent" is meant to include metal oxides generally, and MgO, CaO, FeO, $Fe_2O_3$ and $Fe_3O_4$ in particular. The amount of metal oxide agent added is typically less than 30 percent by weight relative to the weight of the starting material; in some cases, the weight percentage may be less than 15 percent.

The composition may also include combinations of debris, fly ash, metal oxide agent rather than simply containing a single additive. Concentrations of these additional components would be within the ranges set forth in this section.

The composition is a compacted mixture. Generally, the construction form is compressed at a force of up to 3,000 pounds per square inch, although the actual pressure will depend upon the nature of the starting material and the intended use of the construction form. Preferably, the compressive force is 1,500 to 3,000 pounds per square inch. When fly ash is a component in the composition, pressures may exceed 2,500 pounds per square inch. At 30 percent volume reduction, the density of the resulting construction form is approximately 128 pounds/ft$^3$; at 40 percent volume reduction, density is roughly 170 pounds/ft$^3$. Final densities vary with the nature of the starting material and the extent of compaction.

The construction form may be of a predetermined shape. The options with regard to the final shape are essentially limitless. In general, a shape is desired which enables multiple construction forms to be interlinked with one another, thereby enhancing their use in construction projects. Examples of construction forms having particularly useful shapes include, but are not limited to, rectangular, square, hexagonal, and T-shaped blocks.

The construction form may also include a first interlocking member. Such a member might include, for example, a hole running through the construction form through which a connecting rod might be inserted to assist in stabilizing a stack of construction forms. More preferably, the construction form includes a first and second interlocking member, such that an interlocking member on one construction form is capable of interlocking with an interlocking member on another construction form. For example, a construction form may have a first and second face which are on opposing sides of the construction form. A first interlocking member might be located on the first face; the second interlocking member might be located on the second face. The interlocking members would be sized so that a first interlocking member on one construction form would be capable of interlocking with the second interlocking member on another construction form. In such a case, the first interlocking member might include a ridge, whereas the second interlocking member might include a depression sized to accommodate the ridge on another block. Numerous other variations on these general approaches could be successfully utilized.

The construction form composition may also include a water-proofing agent to increase the stability of the construction form when exposed to water for extended periods. Numerous water-proofing agents could be utilized, including, for example, polyvinyl alcohol, polyurethane and asphalt emulsions.

The construction forms of the present invention can be utilized in a number of different ways. Illustrative examples include use in pit liners, erosion control systems, construction barriers, road beds, embankments and retaining walls.

Method of Producing Construction Forms

Figure 3:
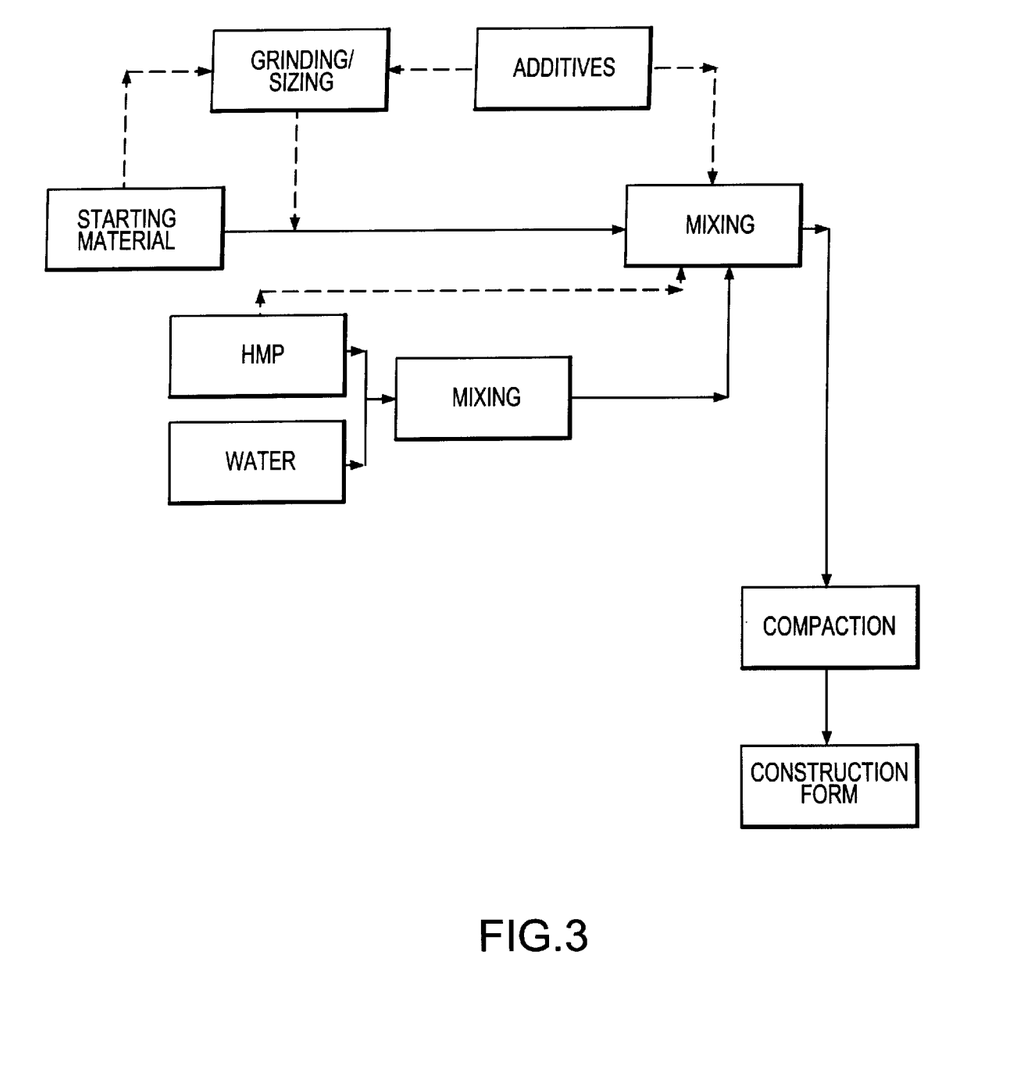
FIG. 3 is a schematic diagram of the method for producing construction forms as provided by the current invention.

The method of the invention further provides a method for producing construction forms from a starting material and HMP, with or without other additives; the process is shown schematically in FIG. 3, where the broken lines indicate optional steps.

In general, the method comprises two primary steps. The first step involves mixing a starting material with HMP to form a mixture, wherein the starting material is soil, soil-containing compositions, mine tailings, mill tailings, or combinations of these. Secondly, the mixture is compacted to produce the construction form.

Although not required, the starting material is preferably reduced in size by grinding and screening the starting material; most preferably the starting material is size reduced to 4 centimeters or less in all dimensions. It is not necessary, however, to produce a powder wherein the average particle size is on the micron level.

A solution containing HMP is prepared by diluting a concentrated form of HMP with water. Although the use of a HMP solution is preferred, it is possible to provide the HMP in solid form, especially if the starting material has sufficient inherent moisture. In general, the amount of HMP used is as described above for the section on the composition of the construction forms.

A mixing step follows the preparation of the starting material and the HMP solution. In this step, the starting material is mixed with at least HMP to form a mixture During the mixing step, it is possible to include other additives. Like the starting material, any additives which are included are preferably size reduced to 4 centimeters or less in all dimensions. The type and amount of the additives which can be mixed with starting material and HMP are as described in the section on construction form composition These additions may be prior to, at the time of, or after the HMP has been added.

The mixing of the starting material, HMP and additives, if any, can be performed in any type of mixer which can adequately blend the components into a uniform mix, including, for example, a pug mill or other standard mixing equipment. If prepared as a solution, the HMP solution, can be pumped using conventional pumping into a spray bar which is located in the mixer and the solution sprayed over the mix. The HMP solution is typically added in minutes and mixed with the starting material and any additives until the HMP solution is uniformly distributed throughout the mixture. This mixing step can often be accomplished in as little as five minutes or less.

The moisture content of the mixture is preferably less than 10 percent by weight, and most preferably, is 8 percent or less. Based on the moisture content of the mixture, additional water may be added as necessary to achieve the preferred moisture levels. The preferred water content will also depend upon the physical characteristics of the starting material and can be varied so that after compaction a physically stable product is obtained.

After the mixture has been adequately mixed, it is compacted. Here, too, "compaction" is defined to mean not just the addition of pressure, but the application of force which results in densification and significant volume reduction of the original material. The compaction step can be accomplished using any of the methods described earlier in the section describing methods for treating wastes.

With many compactors, it is possible to compact the mixture into any number of desired shapes. A variety of presses designed specifically for manufacturing bricks have been patented and could be used in the current invention, including the presses described in U.S. Pat. Nos. 5,145,692 to Hereford; 4,640,671 to Wright; 4,559,004 to Augier; and 4,035,128 and 4,050,865 to Drostholm, et al.

Compaction forces will vary depending on the final composition of the mixture and on the intended use of the construction form, but typically a force of up to 3,000 pounds per square inch is applied. Preferably, the compressive force is 1,500 to 3,000 pounds per square inch. In some instances, particularly when fly ash is added, the compressive forces may exceed 2,500 psi. Volume reductions up to and greater than 50 volume percent are achieved depending on the composition of the starting material and the compaction force which is applied. Preferably, compaction achieves a volume reduction of at least 20 percent.

The method may include a curing step after the compacting step in order to obtain a stronger construction form.

During the curing step, the construction form is allowed to dry at room temperature, typically for a period ranging from one hour to about one month. Often a cure period of approximately 7 days is sufficient to yield a construction form having high compressive strength.

A water-proofing agent may also be added to the construction form to enhance the durability of the construction form when exposed to water. The water-proofing agent may include, but is not limited to, polyvinyl alcohol, polyurethane and asphalt emulsions. The water-proofing agent may be applied by coating the construction form or by including the water-proofing agent during the mixing step.

Method of Using Construction Forms

The excellent compressive strength characteristics and durability make the construction forms of the present invention well-suited for use in essentially any construction project, including for example, use in barriers, embankments, and even homes. The optional interlocking members facilitates stacking and arranging the construction forms into a stable assembly. The following are a non-exclusive list of representative examples of how the construction forms of the present invention could be utilized. This list is in no way to be considered a complete listing of the uses of the present construction forms.

The construction forms can be used in the construction of disposal pit liners. In this case, construction forms are prepared as described above. After selecting an appropriate location, a disposal pit is excavated to the desired size. The construction forms can then be arranged and interlinked using the interlocking members to form a stable and long-lasting liner.

The construction forms also have utility in preparing a variety of walls and barriers which can be used in erosion control projects, construction barriers and retaining walls. By stacking the construction forms, preferably using the interlocking members to impart greater stability, the appropriate barrier or wall could be built.

Using the construction forms in road beds represents another use of the current construction forms. In this case, the road surface could optionally be prepared using earth moving equipment to level the site. The construction forms could then be arranged, again preferably using the interlocking members, to form a stable road surface.

Soil Stabilization

The present invention also provides a method of stabilizing soils. This stabilization can be used to protect treated areas against erosion, restrict dust formation, to prepare a firm base for various construction projects, including for example, road beds, and to stabilize older unstabilized earthen structures.

The method comprises preparing a stabilizing solution which includes a quantity of HMP and water, applying the stabilizing solution to a quantity of soil which is to be treated and compacting the treated soil.

The amount of HMP included in the stabilizing solution preferably is between approximately 0.70 and 1.75 kg per liter of water; most preferably, the HMP concentration is approximately 1.75 kg per liter of water. Alternatively, HMP may be applied as a solid, especially when the soil at the treatment site contains moisture. The amount of HMP applied to the soil is preferably between approximately 0.5 and 8.0 percent by dry weight relative to the soil which is treated. Most preferably, the amount of HMP is between approximately 1 and 3 percent by dry weight.

Prior to applying the stabilizing solution, the treatment site may be prepared to facilitate mixing of the stabilizing solution with the soil located at greater depths. Site preparation may include adjusting the moisture content of the soil at the treatment site and breaking up or loosening the soil to facilitate penetration of the stabilizing solution into the ground. In adjusting the moisture content, the moisture content of the soil at the treatment site is preferably adjusted to about ten percent by weight. When loosening the topsoil, the soil at the treatment site may be scarified to a desired depth using any of a variety of earth tilling implements.

The stabilizing solution may be applied directly to the soil which is to be treated without moving the soil to a separate treatment area (in-situ method). When the stabilizing solution is applied in-situ, the solution can be applied in a variety of ways. Preferably, the solution is sprayed over the surface of the treatment site. This may be accomplished using a tank truck having a spray bar from which the stabilizing solution is, dispersed either under gravity or by use of a spray pump. The stabilizing solution may be applied as a single coat or as multiple coats depending upon the degree of stabilization required. HMP may also be applied as a solid, especially when the soil contains moisture.

The applying step may also include a mixing step in order to more evenly coat soil particles at the treatment site. Mixing can be accomplished in numerous ways, including, for example, using machinery to blade soil back and forth across the treatment area or using various tillers. After the soil at the treatment site has been adequately mixed, the soil is spread uniformly over the treatment site.

Rather then treating the soil in-situ, it is also possible to transport soil to a mixing site, apply the HMP and then place the soil at a desired location. The amount of HMP utilized in such cases remains the same as for in-situ treatment. In this case, the applying step involves mixing the soil and stabilizing mixture in any type of mixer which can adequately blend the components into a uniform mix, including for example, a pug mill. If prepared as a solution, the HMP mixture, can be pumped using conventional pumping into a spray bar which is located in the mixer and then sprayed over the mix. The HMP mixture is typically added in minutes.

The treated soil is then compacted. Compaction can be achieved in a variety of ways, including, but not limited to, using rubber tired rollers, a sheepsfoot, or various rollers.

In some cases it may be desired to include additional agents in the stabilizing solutions. Examples include pigmented material, the addition of which can be used to impart a desired color to the solution. If desired, wetting agents to facilitate penetration of the stabilizing solution into the soil may also be used. Hardening agents can also be added.

The foregoing discussion has presented a general overview of the different aspects of the present invention. Below are examples which describe in greater detail the various aspects of the invention. In particular, the examples describe methods utilizing HMP which can be used to stabilize diverse waste forms so that leach rates of contaminants, particularly metals, are below regulatory levels. The examples also illustrate the chemical stability and mechanical strength of construction forms prepared according to the method of the current invention.

EXAMPLE I

Treatment of Sand/Clay Samples

One waste type treated included soil samples composed primarily of sand and clay. Clay comprised 20% to 40% of the sample composition by weight and sand comprised the remaining 60 to 80%. Separate tests using the sand/clay samples were run at both bench-scale (0.25 pounds of waste material/block) and full-scale (36 pounds of waste material/block) under room temperature conditions. In one set of tests, the sand/clay samples were mixed only with the HMP solution. In the second set of tests, debris (10% by volume relative to the sand/clay sample) was combined with the sand/clay. The samples and fly ash, if added, were size reduced to 4 cm or less in all dimensions prior to adding HMP.

Dry, powdered sodium hexametaphosphate (HMP) was purchased from Monsanto. HMP was added to water in the concentration of 1.75 kg per liter of water; dissolution was achieved at room temperature. In each set of tests, HMP was sprayed uniformly over the samples and the resulting amended waste thoroughly mixed.

Compaction was accomplished using a conventional compaction method, namely a hydraulic punch and die. For bricks sized 10 in. by 14 in., compaction forces were approximately 1,600 pounds per square inch. After compacting, the compacted amended waste was allowed to cure for approximately 7 days. Compressive strengths were determined using a point load machine according to ASTM methods (unless stated otherwise, all compression values are reported in kg/cm$^2$; these values can be converted to pounds per square inch by multiplying by 14.22). Volume reduction, i.e. the extent of compaction, was determined by subtracting the volume of the compacted amended waste from the bulk volume of the starting waste (including debris, if any), dividing the difference by the volume of the starting waste and then multiplying by 100.

Samples were subjected to the Toxicity Characteristic Leaching Procedure (TCLP) test as described in 40 C.F.R. 260.11 and 261.24(a) to determine the extent to which metals leached from the compacted amended waste. In general, the TCLP methodology involves agitating a 100 g sample, randomly obtained from the waste being tested, in 2 liters of a specified extraction fluid after first sizing the waste to smaller than ⅜ inches or 9.5 mm. The agitation step is continued for 18 hours using a rotating agitator which is operating at a speed of 30 revolutions per minute. A sample of the extraction fluid is then tested for the particular contaminant or contaminants of interest.

For the metals covered under current TCLP regulations (40 C.F.R. 261.24(a) (1996)), the maximum concentration at which these metals can leach into the specified extraction solution is (all concentrations expressed as mg/l): arsenic, 5.0; barium, 100.0; cadmium, 1.0; chromium, 5.0; lead, 5.0; mercury, 0.2; selenium, 1.0; silver, 5.0. These limits are listed in the second to the last line of Table 1 and are similarly listed in the other Tables.

As Table 1 indicates, the TCLP results were within the regulatory limits established for the metals tested (cadmium, chromium and lead), except for cadmium at the bench-scale level when debris was included. Compressive strength was well above the test objective of 70 kg/cm$^2$ (995 psi). Volume reductions of 28 to 44 percent were achieved.

TABLE 1

TREATMENT OF METAL-CONTAINING SAND/CLAY WASTE WITH PHOSPHATE AND COMPACTION: TCLP, COMPRESSIVE STRENGTH AND VOLUME REDUCTION RESULTS

| Surrogates & Waste Forms | Total Metals (mg/l) | | | TCLP Metals (mg/l) | | | Compressive Strength (kg/cm$^2$) | Bulk Volume Reduction (%) |
|---|---|---|---|---|---|---|---|---|
| | Cd | Cr | Pb | Cd | Cr | Pb | | |
| Sand/Clay Bench-Scale | | | | | | | | |
| w/o Debris | 1067.0 | 21.0 | 1967.0 | 0.5 | <0.01 | <0.01 | 345 | 28 |
| w/10% Debris | 1067.0 | 21.0 | 1967.0 | 4.5 | <0.01 | 0.2 | 283 | |
| Full-Scale | | | | | | | | |
| w/o Debris | 1067.0 | 21.0 | 1967.0 | 0.2 | <0.1 | 0.1 | 359 | 44 |
| w/10% Debris | 1067.0 | 21.0 | 1967.0 | 0.0 | 0.0 | 0.1 | | |
| Treatment Std. | | | | 1.0 | 5.0 | 5.0 | | |
| Test Objective | | | | | | | 70 | |

EXAMPLE II

Treatment of Buried Waste Samples

The efficacy of the present method was also tested with a second set of samples comprised of surrogates to simulate buried waste from a DOE site, in particular, a Fernald OU-1 waste pit. Test conditions were generally as described in Example I. Tests were performed at the bench-scale and full-scale level, with or without added debris. As shown in Table 2, TCLP tests were conducted for cadmium, chromium and lead; the TCLP limits were met for each of these metals. Compressive strengths were well above the test objective of 70 kg/cm$^2$, with or without the addition of debris, ranging from 318 to 409 kg/cm$^2$. Significant volume reduction was also achieved, ranging from 43 to 64 percent.

TABLE 2

TREATMENT OF METAL-CONTAINING BURIED WASTE WITH PHOSPHATE AND COMPACTION: TCLP, COMPRESSIVE STRENGTH AND VOLUME REDUCTION RESULTS

| Surrogates & Waste Forms | Total Metals (mg/l) | | | TCLP Metals (mg/l) | | | Compressive Strength (kg/cm$^2$) | Bulk Volume Reduction (%) |
|---|---|---|---|---|---|---|---|---|
| | Cd | Cr | Pb | Cd | Cr | Pb | | |
| Buried Waste Bench-Scale | | | | | | | | |
| w/o Debris | 1159.0 | 32.3 | 1045.0 | <0.01 | <0.01 | <0.01 | 318 | 43 |
| w/10% Debris | 1159.0 | 32.3 | 1045.0 | 0.3 | 0.2 | <0.01 | 409 | |
| Full-Scale | | | | | | | | |
| w/o Debris | 1159.0 | 32.3 | 1045.0 | <0.05 | 0.2 | <0.01 | | 64 |
| Treatment Std. | | | | 1.0 | 5.0 | 5.0 | | |
| Test Objective | | | | | | | 70 | |

EXAMPLE III

Treatment of Mill Tailing Samples

A set of tests was also conducted on surrogates simulating mill tailings from a DOE Fernold Silo 3 waste site. Trials were conducted at the bench-scale and full-scale level. At the bench-scale level, separate trials were conducted with and without added debris. Testing protocols were as described for Example I. TCLP leaching results for the metals tested were all well within the established limits except for arsenic and selenium, but even in these cases the metal concentration was reduced by nearly two orders of magnitude or more relative to the starting concentration (Table 3). Compressive strengths at the bench-scale and full-scale level were significantly above the objective of 70 kg/cm$^2$. Bulk volume reductions ranged from 31 to 66 percent.

EXAMPLE IV

Treatment of Mine Tailing Samples

The ability of the current method to stabilize metals in mine tailings was also examined using the procedure described in Example I. As shown in Table 4, the TCLP leaching results were all under the regulatory limits. Furthermore, compressive strengths in each case were significantly above the objective of 70 kg/cm$^2$. Bulk volume reductions ranged from 33 to 44 percent.

TABLE 3

TREATMENT OF METAL-CONTAINING MILL TAILINGS WASTE WITH PHOSPHATE AND COMPACTION: TCLP, COMPRESSIVE STRENGTH AND VOLUME REDUCTION RESULTS

| Surrogates & Waste Forms | Total Metals (mg/l) | | | | | | | TCLP Metals (mg/l) | | | | | | | Compressive Strength (kg/cm$^2$) | Bulk Volume Reduction |
|---|---|---|---|---|---|---|---|---|---|---|---|---|---|---|---|---|
| | As | Cd | Cr | Pb | Hg | Se | Ag | As | Cd | Cr | Pb | Hg | Se | Ag | | |
| Mill Tailings Bench-Scale | | | | | | | | | | | | | | | | |
| w/o Debris | 2200.0 | 40.0 | 570.0 | | | 200.0 | | 23.3 | 1.1 | <0.1 | | | 8.5 | | 394 | 31 |
| w/10% Debris | 2200.0 | 40.0 | 570.0 | | | 200.0 | | 53.5 | 0.8 | <0.1 | | | 9.4 | | 1054 | 31 |
| Full-Scale | | | | | | | | | | | | | | | | |
| w/o Debris | 14,100 | 574.0 | 92.0 | <10 | <0.1 | 560.0 | <2 | 84.0 | 0.4 | 0.0 | <.05 | <.02 | 10.0 | <.02 | | 66 |
| w/10% Debris | | | | | | | | | | | | | | | | |
| Treatment Std. | | | | | | | | 5.0 | 1.0 | 5.0 | 5.0 | 0.2 | 1.0 | 5.0 | | |
| Test Objective | | | | | | | | | | | | | | | 70 | |

TABLE 4

TREATMENT OF METAL-CONTAINING MINE TAILINGS WASTE WITH PHOSPHATE AND COMPACTION: TCLP, COMPRESSIVE STRENGTH AND VOLUME REDUCTION RESULTS

| Surrogates & Waste Forms | Total Metals (mg/l) | | | | | | | TCLP Metals (mg/l) | | | | | | | Compressive Strength (kg/cm²) | Bulk Volume Reduction |
|---|---|---|---|---|---|---|---|---|---|---|---|---|---|---|---|---|
| | As | Cd | Cr | Pb | Hg | Se | Ag | As | Cd | Cr | Pb | Hg | Se | Ag | | |
| Mine Tailings Bench-Scale | | | | | | | | | | | | | | | | |
| w/o Debris | 0.5 | 20.9 | 2.5 | 4309.0 | 0.0 | 0.0 | 20.5 | 2.1 | <0.05 | <0.1 | 0.1 | 0.0 | <0.5 | <0.1 | 203 | 44 |
| w/10% Debris | 0.5 | 20.9 | 2.5 | 4309.0 | 0.0 | 0.0 | 20.5 | <0.05 | <0.05 | <0.1 | <0.1 | 0.0 | <0.5 | <0.1 | 327 | |
| Full-Scale | | | | | | | | | | | | | | | | |
| w/o Debris | 0.5 | 20.9 | 2.5 | 4309.0 | 0.0 | 0.0 | 20.5 | 1.0 | 0.0 | <0.01 | <0.05 | 0.0 | <0.1 | <0.01 | 78 | 33 |
| w/10% Debris | 0.5 | 20.9 | 2.5 | 4309.0 | 0.0 | 0.0 | 20.5 | 0.8 | 0.0 | <0.01 | <0.05 | 0.0 | <0.1 | <0.01 | — | |
| Treatment Std. | | | | | | | | 5.0 | 1.0 | 5.0 | 5.0 | 0.2 | 1.0 | 5.0 | | |
| Test Objective | | | | | | | | | | | | | | | 70 | |

EXAMPLE V

Compressive Strength of Construction Forms Prepared from Diverse Starting Materials Diverse starting materials were utilized to prepare construction forms according to the method of the present invention. The starting materials included samples comprised primarily of: 1) sand and clay, 2) mill tailings, and 3) mine tailings.

In each case, construction forms were prepared at bench scale (0.25 pounds of starting material/construction form) and full scale (36 pounds of starting material/construction form). Separate tests at each of these levels were generally conducted with and without added debris (generally 10 percent by volume). The starting materials were first ground and then size reduced so that particles were less than 4 cm in all dimensions. When debris was added, it was size reduced in a similar fashion.

The HMP employed in this test was dry, powdered sodium hexametaphosphate (HMP) purchased from Monsanto. HMP was added to water in the concentration of 1.75 kg per liter of water; dissolution was achieved at room temperature. In each set of tests, HMP was sprayed uniformly over the samples and mixed with the starting material and debris, if any. Final HMP concentration based upon the dry weight of the powder was approximately 6 percent relative to the weight of the starting material.

Compaction was accomplished using a conventional compaction method, namely a hydraulic punch and die. For blocks sized 10 in. by 14 in., compaction forces were approximately 1,600 pounds per square inch. After compacting, the construction form was allowed to cure for approximately 7 days. Compressive strengths were determined using a point load machine according to standard ASTM methods. Volume reduction, i.e. the extent of compaction, was determined by subtracting the volume of the final construction form from the bulk volume of the starting material (including debris, if any), dividing the difference by the volume of the starting material plus any debris and then multiplying the result by 100.

The volume reduction and compressive strengths achieved with these diverse starting materials are summarized in Table 5. Volume reductions of at least 28 percent were obtained and in some cases exceeded 60 percent. Excellent compressive strength values were likewise achieved, ranging from 78 kg/cm² to 1054 kg/cm². In general, the values tended to fall within the range of 200 to 400 kg/cm², well in excess of the test objective of 70 kg/cm². These results demonstrate the utility of the method in producing strong and compact construction forms from very diverse starting materials which are well-suited for a variety of construction projects.

TABLE 5

| Surrogates & Waste Forms | Compressive Strength (kg/cm squared) | Bulk Volume Reduction (%) |
|---|---|---|
| Sand/Clay Bench-Scale | | |
| w/o Debris | 345 | 28 |
| w/10% Debris | 283 | — |
| Full-Scale | | |
| w/o Debris | 359 | 44 |
| w/10% Debris | — | — |
| Mill Tailings Bench-Scale | | |
| w/o Debris | 394 | 31 |
| w/5% Debris | 1054 | 31 |
| Full-Scale | | |
| w/o Debris | — | 66 |
| w/Debris | — | — |
| Mine Tailings Bench-Scale | | |
| w/o Debris | 203 | 44 |
| w/Debris | 327 | — |
| Full-Scale | | |
| w/o Debris | 78 | 33 |
| w/10% Debris | — | — |

EXAMPLE VI

Dependence of Compressive Strength on HMP Concentration

Figure 4:
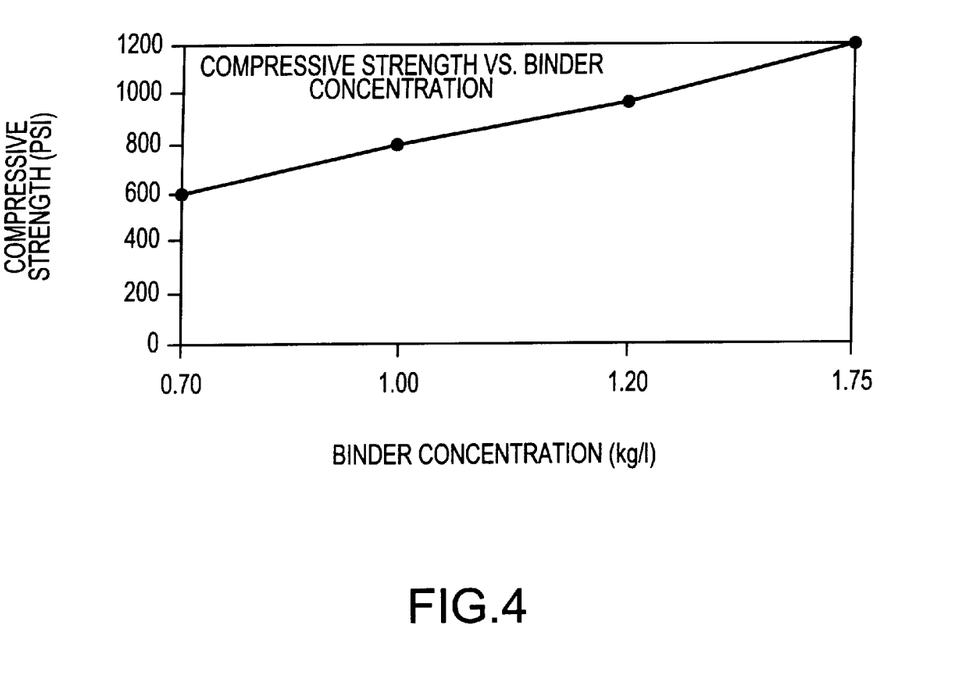
FIG. 4 is a graph illustrating how the compressive strength of the final product prepared according to the current invention increases as the concentration of hexametaphosphate is increased.

The dependence of construction form compressive strength as a function of HMP concentration was examined. The starting material was composed of sand/clay mixtures. Different aqueous solutions containing increasing concentrations of HMP were prepared (0.70, 1.0, 1.20 and 1.75 kg/l). The samples of starting material were treated and compacted as described in Example V. Compressive strength was determined as described in Example V. As shown in FIG. 4, compressive strength increased with increasing binder concentration. In particular, compressive strength doubled (600 psi to 1200 psi) as the concentration of HMP was increased from 0.70 kg/l to 1.75 kg/l.

As noted in Example V, diverse sample types treated with HMP solutions having a concentration of 1.75 kg/l resulted in compacted waste forms having compressive strengths which generally exceeded 70 kg/cm$^2$ and often had compressive strengths ranging from 203 to 400 kg/cm$^2$. When solutions containing 1.75 kg/l of HMP were used, this meant that the concentration of HMP expressed as dry weight was approximately 6 percent relative to the starting material A second set of compressive strength tests were also conducted on bricks having concentrations of HMP ranging from 1 to 8.75 percent of the starting material by weight. Fly ash was also included at 15 weight percent. Bricks were prepared as described in Example V, including the 7 day cure period. Compressive strength values were also determined as described in Example V.

The durability of construction forms when submerged in water was determined using the CRUMB Test (USBR 5400). During these tests, construction forms were immersed in water having a temperature of 20° C. for 24 hours and the physical integrity of the forms monitored with time.

The construction forms were classified as Grade 1 or 4; grades 2 and 3 were not considered during the classification process because these intermediate situations are not taken into account in the construction industries. Grade 1 means the brick is nondispersive under the test conditions just described. In particular, no clay suspension is noticed in the dish used for the test; thus, the brick is classified as insoluble in water after 24 hours of immersion. Grade 4 means the brick is dispersive. In this case, bricks subjected to the test disintegrate in water in less than 24 hours; thus, the bricks are classified as soluble in water.

Table 6 summarizes the results of the compressive strength and CRUMB tests. The first number in the Sample I.D. in Table 6 represents HMP concentration; the second number represents fly ash concentration. For example, sample 1B-15A contained 1 percent HMP and 15 percent fly ash by weight, relative to the weight of the starting material. The results show that compressive strength increased with increasing phosphate concentration. Yet, even at very low concentrations of HMP, excellent compressive strength was obtained. In all cases except one, the bricks were nondispersive as defined according to the CRUMB test.

TABLE 6

Dependence of Compressive Strength on Phosphate Concentrations

| Sand - Clay Surrogate (Sample I.D.) | Compressive Strength (7 days cure time) (psi) | Grade (CRUMB Test - USBR 5400) |
|---|---|---|
| 1B-15A | 2300 | 1 |
| 3B-15A | 2430 | 1 |
| 5B-15A | 4070 | 1 |
| 7B-15A | 4710 | 1 |
| 8.75B-15A | 6060 | 4 |

EXAMPLE VII

Effect of Cure Time on Compressive Strength

Tests were performed to evaluate the dependence of compressive strength with the amount of time the construction forms were allowed to cure. Construction form composition and preparation were as described in Example V. Construction forms prepared from the same batch of starting material were allowed to air dry for either 7 or 40 days and then compressive strengths determined. Results are shown in Table 7. Compressive strength increased with increasing cure time. However, even a 7 day cure time resulted in construction forms having high compressive strengths.

TABLE 7

Effect of Cure Time on Compressive Strength

| Sand - Clay Surrogate | 7 Days Cure Time | 40 Days Cure Time |
|---|---|---|
| 1B-15A | 2300 | 2670 |
| 3B-15A | 2430 | 3040 |
| 5B-15A | 4070 | 5640 |
| 7B-15A | 4710 | 6950 |
| 8.75B-15A | 6060 | 6430 |

The foregoing examples are to be considered in all respects as illustrative of the current invention rather than to be restrictive. It will be appreciated by those skilled in the art that additions, modifications, substitutions and deletions not specifically described may be made without departing from the spirit and broad scope of the current invention.

We claim:

1. A method for reducing the leachability of heavy metal in a solid waste, tailing or soil to TCLP leaching criteria, said method comprising:
   (a) a combining step which includes mixing said solid with a quantity of hexametaphosphate to form an amended material, and
   (b) compacting said amended material using conventional compaction to produce a compacted amended material.

2. A method according to claim 1, wherein said solid waste, tailing or soil is radioactive.

3. A method according to claim 1, wherein said amended material has a water content of 10 percent or less by weight.

4. A method according to claim 1, wherein said solid waste, tailing or soil also contains a quantity of debris, wherein said quantity of debris is selected from the group consisting of, glass, metal, plastic, paper, concrete, asphalt, wood, ceramics and combinations thereof.

5. A method according to claim 1, wherein said combining step further includes mixing said solid waste, tailing or soil and said quantity of hexametaphosphate with a quantity of fly ash.

6. A method according to claim 5, wherein said a quantity of fly ash is more than zero and less than 25 percent of said solid waste by weight.

7. A method according to claim 1, wherein said combining step further includes mixing said solid waste, tailing or soil and said quantity of hexametaphosphate with a metal oxide agent.

8. A method according to claim 7, wherein said metal oxide agent is more than zero and less than 50 percent of said solid waste, tailing or soil by weight.

9. A method according to claim 1, wherein said combining step further includes mixing said solid waste, tailing or soil and said quantity of hexametaphosphate with at least two additives selected from the group consisting of a quantity of debris, a quantity of fly ash and a metal oxide agent.

10. A method according to claim 1, wherein said quantity of hexametaphosphate is supplied as a solid.

11. A method according to claim 1, wherein said quantity of hexametaphosphate is between approximately 0.5 and 8 percent of said solid waste, tailing or soil by weight.

12. A method according to claim 1, wherein said quantity of hexametaphosphate is between approximately 1 and 3 percent of said solid waste, tailing or soil by weight.

13. A method according to claim 1, further including a step wherein said solid waste, tailing or soil is sized to approximately 4 centimeters or less in all dimensions before said combining step.

14. A method according to claim 1, wherein said compacting step includes placing said amended material in a compactor and then compressing said amended material.

15. A method according to claim 14, wherein said compressing step includes compressing said amended material at more than zero and up to 3,000 pounds per square inch.

16. A method according to claim 1, wherein said compacting step is done in-situ, without transferring said amended material to a compactor.

17. A method according to claim 1, wherein said compacting step includes reducing the bulk volume of said amended material by at least 20 percent.

18. A method according to claim 1, further including a grinding step wherein said solid waste, tailing or soil is ground to approximately 4 centimeters or less in all dimensions and wherein
   (a) said quantity of hexametaphosphate is approximately 0.5 to 8 percent of said solid waste, tailing or soil by weight; and
   (b) said amended material has a water content of 10 percent or less by weight.

19. A method according to claim 18, wherein said combining step further includes mixing said solid waste, tailing or soil and said quantity of hexametaphosphate with an additive selected from the group consisting of debris, fly ash, and metal oxide agent.

20. A method according to claim 1, wherein said combining step does not include combining said solid waste, tailing or soil and said quantity of hexametaphosphate with a material selected from the group consisting of a sulfate agent, a carbonate agent, a metal oxide agent, a hydroxide agent and combinations thereof.

21. A method for stabilizing solid material selected from the group consisting of soil, mill tailings, mine tailings, buried waste and combinations thereof; wherein said material is contaminated with heavy metal, comprising;
   (a) obtaining a quantity of said solid material;
   (b) acquiring a quantity of hexametaphosphate; and
   (c) combining said quantity of said solid material and said quantity of hexametaphosphate to form an amended material.

22. A method for treating a liquid-containing radioactive material to TCLP leaching standards comprising:
   (a) a combining step which includes mixing said liquid-containing radioactive material with a quantity of hexametaphosphate and soil to form a compressible amended material; and
   (b) compacting said compressible amended material using conventional compaction to form a compacted amended material.

23. A method according to claim 22, wherein said liquid-containing radioactive material is selected from the group consisting of sludge and slurries.

24. A method according to claim 22, wherein said compressible amended material has a water content of 10 percent or less by weight.

25. A method according to claim 22, wherein said liquid-containing radioactive material also contains a quantity of debris, wherein said quantity of debris is selected from the group consisting of, glass, metal, plastic, paper, concrete, asphalt, wood, ceramics and combinations thereof.

26. A method according to claim 22, wherein said combining step includes mixing with a quantity of fly ash.

27. A method according to claim 26, wherein said quantity of fly ash is more than zero and less than 25 percent of said liquid-containing material by weight.

28. A method according to claim 22, wherein said combining step includes mixing with a metal oxide agent.

29. A method according to claim 28, wherein said metal oxide agent is more than zero and less than 50 percent of said liquid-containing material by weight.

30. A method according to claim 22, wherein said combining step includes mixing with two additives selected from the group consisting of debris, fly ash and metal oxide agent.

31. A method according to claim 22, wherein said quantity of hexametaphosphate is supplied as a solid.

32. A method according to claim 22, wherein said quantity of hexametaphosphate is between approximately 0.5 and 8 percent of said liquid-containing material by weight.

33. A method according to claim 22, wherein said quantity of hexametaphosphate is between approximately 1 and 3 percent of said liquid-containing material by weight.

34. A method according to claim 22, wherein said compacting step includes placing said compressible amended material in a compactor and then compressing said compressible amended material.

35. A method according to claim 34, wherein said compressing step includes compressing said compressible amended material at a compressive force of more than 1500 pounds per square inch and up to 3,000 pounds per square inch.

36. A method according to claim 22, wherein said compacting step is done in-situ, without transferring said amended material to a compactor.

37. A method according to claim 22, wherein said compacting step includes reducing the bulk volume of said compressible amended material by at least 20 percent.

38. A method according to claim 22, wherein said combining step does not include mixing with an additive selected from the group consisting of a sulfate agent, carbonate agent, a metal oxide agent, a hydroxide agent and combinations thereof.

39. A method according to claim 22, wherein:
   (a) said quantity of hexametaphosphate is between approximately 0.5 and 8 percent of said liquid-containing material by weight;
   (b) said amended compressible material has a final water content of 10 percent or less by weight; and
   (c) said compacting step includes compressing said compressible amended material with a compactor at a compressive force of more than 1,500 pounds per square inch and up to 3,000 pounds per square inch.

40. A method according to claim 22, wherein:
   (a) said quantity of hexametaphosphate is between approximately 0.5 and 8 percent of said liquid-containing radioactive material by weight;
   (b) said compressible amended material has a final water content of 10 percent or less by weight; and
   (c) said compacting step includes compressing said compressible amended material with a conventional compactor at a compressive force of more than zero and up to 3,000 pounds per square inch.

41. A method according to claim 40, wherein said combining step includes mixing with an additive is selected from the group consisting of soil, debris, fly ash and metal oxide agent.

42. A method for stabilizing liquid-containing material contaminated with heavy metal to TCLP leaching standards comprising:
   (a) acquiring a quantity of said liquid-containing material;
   (b) preparing a quantity of hexametaphosphate; and
   (c) combining said quantity of said liquid-containing material and said quantity of hexametaphosphate and with soil to form an amended material.

43. A method of manufacturing a building brick or block that meets TCLP leaching standards, comprising:
   (a) mixing a starting material with a quantity of hexametaphosphate to form a mixture, said starting material selected from the group consisting of soil, soil-containing compositions, mine tailings, mill tailings and combinations thereof, that are contaminated with heavy metal; and
   (b) compacting said mixture to produce said brick or block.

44. A method according to claim 43, wherein said mixing step further includes mixing said starting material and said quantity of hexametaphosphate with a quantity of debris, said quantity of debris selected from the group consisting of aggregate, glass, metal, plastic, paper, concrete, asphalt, wood, ceramics and combinations thereof.

45. A method according to claim 43, wherein said mixing step further includes mixing said starting material and said quantity of hexametaphosphate with a quantity of fly ash.

46. A method according to claim 45, wherein said quantity of fly ash is more than zero and less than 25 percent of said starting material by weight.

47. A method according to claim 43, wherein said mixing step further includes mixing said starting material and said quantity of hexametaphosphate with a metal oxide agent.

48. A method according to claim 47, wherein said metal oxide agent is more than zero and up to 50 percent of said starting material by weight.

49. A method according to claim 43, wherein said mixing step further includes mixing said starting material and said quantity of hexametaphosphate with at least two members of the group consisting of debris, fly ash and metal oxide agent.

50. A method according to claim 43, wherein said starting material contains a contaminant selected from the group consisting of metals, radioactive waste and combinations thereof.

51. A method according to claim 43, wherein said mixture has a water content of less than 10 weight percent.

52. A method according to claim 43, wherein said quantity of hexametaphosphate is between approximately 0.5 and 8 percent of said starting material by weight.

53. A method according to claim 43, wherein said quantity of hexametaphosphate is supplied as a solid.

54. A method according to claim 43, further including the step of grinding said starting material to approximately 4 centimeters or less in all dimensions before said mixing step.

55. A method according to claim 43, wherein said compaction step includes compressing said mixture at between approximately 1,500 and 3,000 pounds per square inch.

56. A method according to claim 45, wherein said compaction step includes compressing said mixture at greater than 2,500 pounds per square inch.

57. A method according to claim 43, wherein said compaction step further includes compressing and molding said mixture to create a first interlocking member on said brick or block.

58. A method according to claim 57, wherein said compaction step further includes compressing and molding said mixture to create a second interlocking member on said brick or block.

59. A method according to claim 58, wherein said compaction step further includes compressing and molding said mixture so that said brick or block has a first and a second face, said second face positioned so that it opposes said first face, said first interlocking member being located on said first face and said second interlocking member being located on said second face, said first and second interlocking member being sized so that said first interlocking member on a first brick or block can interlock with said second interlocking member on a second brick or block.

60. A method according to claim 43, further including a coating step in which said brick or block is coated with a water-proofing agent, said water-proofing agent selected from the group consisting of polyvinyl alcohol, polyurethane and asphalt emulsions.

61. A method according to claim 43, wherein said quantity of hexametaphosphate is approximately 0.5 to 8 percent of said starting material by weight, wherein said compacting step includes compressing said mixture at between approximately 1,500 and 3,000 pounds per square inch, and further including a curing step after said compacting step in which said construction form is allowed to dry.

62. A method of according to claim 61, wherein said mixing step further includes mixing said starting material and said quantity of hexametaphosphate with a member of the group consisting of debris, fly ash and metal oxide agent.

* * * * *